United States Patent Office 3,458,548
Patented July 29, 1969

3,458,548
METAL CHELATES OF DIPHENOXYDIBENZOYL-METHANE
Emil Herbert Carlson, Kirkwood, Mo., assignor to Monsanto Company, St. Louis, Mo., a corporation of Delaware
No Drawing. Original application Jan. 2, 1964, Ser. No. 335,386, now Patent No. 3,314,887, dated Apr. 18, 1967. Divided and this application Apr. 18, 1967, Ser. No. 654,288
Int. Cl. C07f 15/00, 7/00, 3/00
U.S. Cl. 260—429                    8 Claims

ABSTRACT OF THE DISCLOSURE

Compounds from the class of heavy metal chelates of diphenoxydibenzoylmethane wherein said heavy metal is from Periods 4, 5, and 6 and Groups 1–B to 8–B and 3–B to 4–A of the Periodic Table of Elements, illustrative examples being cobalt, manganese, lead, iron, copper, and tin. The compounds are useful as antioxidants for polyphenyl ethers.

---

This is a division of my copending application Ser. No. 335,386, filed Jan. 2, 1964, now U.S. Patent No. 3,314,887.

The invention of the subject application is directed to metal chelate compounds of diphenoxydibenzoylmethane, which compounds are useful as antioxidants in polyphenyl ether functional fluid compositions.

The polyphenyl ethers are known compounds found to have excellent thermal stability, very good hydrolytic stability, excellent liquid range, fair pour point, good lubricity, generally good viscosity properties, generally good oxidation stability, very good radiation stability, and excellent useful life at elevated temperatures of the order of about 800° F. and higher, whereby they have found wide application as functional fluid compositions being particularly suitable for high-temperature systems. Thus, the polyphenyl ether functional fluids can be employed as synthetic lubricants in motor operations generally, for jet engines, for supersonic aircraft and missiles, as hydraulic fluids, as diffusion pump fluids, as coolants for electronic equipment, as coolant-moderators for nuclear reactors, as heat-transfer agents, etc.

Representative polyphenyl ether compositions are disclosed in the copending applications of Blake and Harmann, Ser. Nos. 702,767, now abandoned, 766,685, and 101,081, now abandoned, respectively filed Dec. 16, 1957, Oct. 13, 1958, and Apr. 6, 1961, and my copending application Ser. No. 102,662, filed Apr. 13, 1961, now U.S. Patent 3,240,817 all of which applications are incorporated herein by reference.

The principal object of the instant invention is to provide a novel class of metal chelate compounds of diphenoxydibenzoylmethane which compounds are useful as antioxidants and enable the production of polyphenyl ether functional fluid compositions having improved physical and chemical properties, e.q. having improved resistance to oxidation at temperatures above about 550° F. and improved time-temperature-viscosity characteristics. Other objects and advantages of this invention will be apparent to those skilled in the art from the following disclosure.

The polyphenyl ether functional fluid compositions maintain their excellent properties over a wide temperature range up to 800° F. and higher for an extended period of time when employed in a closed system, i.e. in an inert atmosphere. However, at temperatures over about 550° F., wherein the polyphenyl ether compositions are employed in systems exposed to the atmosphere, i.e. exposed to oxygen, the said functional fluid compositions tend to deteriorate over a period of time due to oxidation of the compositions. The oxidation products built up in a particular polyphenyl ether composition gradually effects a substantial increase in viscosity thereof and shortens the useful life of the functional fluid composition.

It has now been found that the useful life of the polyphenyl compositions can be substantially extended by the incorporation therein of small effective amounts of specific antioxidant compositions. Such new specific antioxidant compositions are the metal chelates of diphenoxydibenzoylmethane, e.g., the preferred class of divalent metal chelates can be illustrated by the tetracoordinate structure:

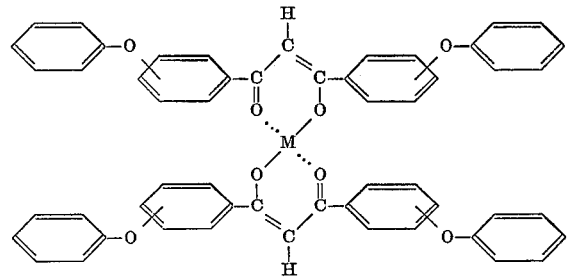

where M is the particular metal involved. It will be apparent that the trivalent metals will provide a hexacoordinate structure rather than the tetracoordinate structure of the divalent chelates.

Chelate-forming metals are set out in the following table in the order of their appearance by Group and Period in the Periodic Table of Elements.

|   | 2A | 3B | 4B | 5B | 6B | 7B | 8B |   |   | 1B | 2B | 3A | 4A | 5A |
|---|----|----|----|----|----|----|----|----|----|----|----|----|----|----|
| 2 | Be |    |    |    |    |    |    |    |    |    |    | B  |    |    |
| 3 | Mg |    |    |    |    |    |    |    |    |    |    | Al | Si |    |
| 4 |    | Sc | Ti | V  | Cr | Mn | Fe | Co | Ni | Cu | Zn | Ga | Ge | As |
| 5 |    | Y  | Zr | Cb | Mo | Ma | Ru | Rh | Pd | Ag | Cd | In | Sn | Sb |
| 6 |    | (¹)| Hf | Ta | W  | Re | Os | Ir | Pt | Au | Hg | Tl | Pb | Bi |

¹ Lanthanides, i.e. elements of atomic number from 57 to 71, inclusive.

The heavy metals of Periods 4, 5 and 6 and Groups 1–B to 8–B and 3–A to 4–A are preferred and of this group the heavy metals of Period 4 are particularly preferred as the more readily available commercial members of the group.

Additionally the phenoxy radicals of the aforesaid class of antioxidant metal chelate compositions may contain further phenoxy groups substituted thereon to provide a plurality of linear phenoxy groups, e.g. a phenoxyphenoxy group, as substituents to the phenyl radicals of the benzoyl moiety of the chelate ligand. All such phenoxy substituents can be in the ortho, meta, or para positions with respect to each other and the aforesaid phenyl radical of the chelate ligand. However, since the all meta polyphenyl ethers, or mixed compositions containing a high percentage of meta linkages, generally have the best fluid characteristics of the polyphenyl ethers, it is also preferred that the phenoxy substituents of the antioxidant metal chelate compositions also be present predominantly in the meta positions.

The optimum concentration of the antioxidant composition will vary with the specific polyphenyl ether composition and the selected particular antioxidant compound. In general, suitable concentrations of antioxidants in weight percent of the polyphenyl ether compositions have been found to be from an effective amount up to about 1 weight percent or more, preferably from about 0.001 to about 0.5 weight percent, and more preferably still from about 0.005 to about 0.1 weight percent. Furthermore, it has been generally observed that too high concentration of antioxidant in the polyphenyl ether compositions tends to accelerate the viscosity increase of the compositions rather than inhibit and retard such viscosity increase, i.e. is less effective than a smaller quantity of the antioxidant. Accordingly, excessive concentrations of antioxidant in the polyphenyl ether compositions should be avoided. It should also be understood that the aforesaid concentrations of the antioxidants contemplates a mixed composition of two or more of the herein disclosed class of antioxidant, as well as the use of a single antioxidant, in which case the aforesaid concentration limits mean the sum of the various antioxidants employed in a particular polyphenyl ether composition.

The standard evaluation procedure employed for determining the antioxidant effect of the metal chelate compositions in polyphenyl ether compositions was by bubbling dry air at the rate of one liter per hour through a twenty plus or minus 0.5-ml. sample of the polyphenyl ether composition, containing a weighed amount of the antioxidant, at 600° F. for either 24 or 48 hours in a system containing metal discs of aluminum, copper, magnesium, silver, stainless steel, and titanium. The metal disc specimens (three-quarter inch outside diameter, one-quarter inch inside diameter, and three-thirty second inch thick) were cleaned and polished according to the procedure of the MIL-L-9326A oxidation-corrosion test specifications and equally spaced with one-quarter plus or minus one-sixteenth inch in length glass tubes of sufficient inside diameter to slip over the air delivery tube and placed in the following order from top to bottom: magnesium, aluminum, copper, stainless steel, titanium, and silver. The extent of oxidation of the test composition is expressed as the percent change in viscosity of the test sample before and after oxidation in the above-described procedure, i.e., the quotient of the difference in the before and after oxidation viscosities at a particular temperature such as 100° F. and 210° F. over the original viscosity of the test sample at the same test temperatures multiplied by 100.

The following examples are illustrative of the instant invention.

EXAMPLE 1

To a 500-ml. round-bottom flask, equipped with a stirrer, thermometer, addition tube, and reflux condenser, charged with 4.4 g. of sodium hydride (0.1 mole, 55% mineral oil dispersion) and 100 ml. hexane was gradually added a solution of 21.2 g. of 4-phenoxyacetophenone (0.1 mole): and 84.2 g. of ethyl 4-phenoxybenzoate (0.1 mole) in 150 ml. of hexane. The reaction mixture was gradually brought to reflux with the deposition of a sticky solid on the walls of the flask, which deposit gradually broke up into a solid after refluxing the mixture for four hours. The reaction mixture was filtered, washed with hexane, and the solid product taken up in ethanol and acidified with hydrochloric acid (specific gravity 1.19) and the boiling slurry produced a light tan solid. Said solid was then crystallized from n-butanol to give light tan sheets, melting point 135.5 to 136.5° C. The product was identified as p,p'-diphenoxydibenzoylmethane.

Calculated for $C_{27}H_{20}O_4$: C, 79.39; H, 4.94. Found: C, 79.26; H, 4.99.

EXAMPLE 2

To a 500-ml. round-bottom flask, equipped as in Example 1, was charged 2 g. of p,p'-diphenoxydibenzoylmethane (0.005 mole) and 200 ml. of absolute ethyl alcohol. The charged mixture was heated at reflux to effect complete solution of the solid in the alcohol. Then a solution of 0.65 g. of cobaltous acetate (0.0025 mole) dissolved in a mixture of 50 ml. ethanol and 10 ml. of water was added to the recation vessel. The reaction mixture turned an orange-brown color with the precipitation of an orange colored solid. A 175-ml. portion of ethanol was removed from the system by distillation and the short orange-colored needles product was separated from the balance of the fluid mixture by filtration. The cobaltous chelate of p,p'-diphenoxydibenzoylmethane was obtained in a yield of 96.7% and found to have a melting point of 199 to 200° C.

Calculated for $C_{54}H_{38}O_8Co$: Co, 6.74. Found: Co, 6.78.

EXAMPLE 3

To a 500-ml. round-bottom flask, equipped as in Example 1, was charged 2 g. of p,p'-diphenoxydibenzoylmethane (0.005 mole) and 200 ml. of absolute ethyl alcohol. The mixture was heated at reflux to effect complete solution of the p,p'-diphenoxydibenzoylmethane, then a solution of 0.65 g. manganese acetate (0.0025 mole) in 50 ml. of ethanol was added to the reaction vessel. The reaction mixture was refluxed for 1.5 hours with the formation of a solid after 0.5-hour reflux. The yellow-green solid reaction product was removed by filtration, the ethanolic mother liquor filtrate concentrated and the additional precipitated solid combined with the first portion of reaction product to give the product in a yield of 87.5%. The combined solid reaction product was dissolved in hot benzene and reprecipitated with the addition of n-butanol thereto. The manganous chelate of p,p'-diphenoxydibenzoylmethane reaction product was recovered as yellow-green colored short fine needles, having a melting point of 211 to 212° C.

EXAMPLE 4

To a 500-ml. round-bottom flask, equipped as in Example 1, was charged 2 g. of p,p'-diphenoxydibenzoylmethane (0.005 mole) and 200 ml. of absolute ethyl alcohol. The mixture was heated at reflux to effect complete solution of the p,p'-diphenoxydibenzoylmethane, then a solution of 0.8 g. lead acetate (0.0025 mole) in a mixture of 50 ml. ethanol and 10 ml. water was added to the reaction vessel. The reaction mixture was refluxed for two hours and then filtered hot to give a yellow-colored solid product. The plumbous chelate of p,p'-diphenoxydibenzoylmethane reaction product was found to have a melting point of 199.5 to 201° C.

EXAMPLE 5

A mixed polyphenyl ether composition consisting of about 65 parts m-bis(m - phenoxyphenoxy)benzene, 30 parts m-(m-phenoxyphenoxy)phenyl p - phenoxyphenyl ether, and 5 parts m-bis(p-phenoxyphenoxy)benzene containing 0.25 weight percent cobaltous chelate of p,p'-diphenoxydibenzoylmethane was prepared. It was observed that said cobaltous chelate was readily dissolved in the hot polyphenyl ether composition and remained in solution on cooling. The antioxidant effect of the cobaltous chelate was determined in the manner of the oxidation stability test procedure at 600° F. for 48 hours as set out hereinabove. From the following evaluation results, it will be observed that the cobaltous chelate of p,p'-diphenoxydibenzoylmethane effectively reduces the rate of viscosity increase of polyphenyl ether compositions when exposed to oxygen at high temperatures.

|  | 100° F. | | | 210° F. | | |
| --- | --- | --- | --- | --- | --- | --- |
|  | Before | After | Percent change | Before | After | Percent change |
| Control | 366.3 | 565.8 | 54.5 | 13.16 | 15.98 | 21.5 |
| Co chelate | 370.1 | 514.0 | 38.9 | 13.28 | 15.31 | 15.3 |

In similar manner the various other disclosed metal chelates of diphenoxydibenzoylmethane are also suitable anti-oxidants in polyphenyl ether compositions when compounded in effective amounts therein.

The polyphenyl ether compositions for use with the novel metal chelate compounds of the present invention generally embrace those compositions containing from 3 to 10, and preferably from 3 to 7, and more preferably still from 4 to 5 benzene rings in the polyether chain together with corresponding limits of the aforesaid numbers minus one of oxygen, and/or sulfur, ether linkages therein, i.e. a plurality of oxa and/or thia linkages. Additionally such compositions preferably contain a major proportion of meta-linkages in the sum of the polyphenyl ether components comprising such compositions, i.e. the ether meta-linkages in any particular composition should be of the order of at least about 50 percent of the total ether linkages in said composition. Whereas it is preferred that the polyphenyl ether components be unsubstituted compounds, the polyphenyl ether components can have various hydrocarbyl (i.e. alkyl, cycloalkyl, aralkyl, alkaryl, and aryl) substituents, preferably containing not more than 10 carbon atoms therein. In regard to such substituted components, it is further preferred that any such substituent be free from hydrogen atoms on the carbon atom linked to the benzene ring of the polyphenyl ether, e.g. tert.-butyl, tert.-amyl, 1-methylcyclohexyl 1-methylcyclopentyl, α-cumyl, tolyl, phenyl, etc. Specifically the polyphenyl ether compositions containing at least 50 weight percent of the all meta unsubstituted polyphenyl ether components are preferred as the base fluid for use with the aforesaid novel class of metal chelate compounds of diphenoxydibenzoylmethane of the present invention.

I claim:

1. The metal chelate compounds of diphenoxydibenzoylmethane, wherein the metal is selected from the group consisting of the heavy metals of Periods 4, 5, and 6 and Groups 1–B to 8–B and 3–A to 4–A of the Periodic Table of Elements.

2. The compounds of claim 1, wherein the heavy metal is selected from the group consisting of cobalt, manganese, lead, iron, copper, and tin.

3. The compound of claim 1 wherein the metal is cobalt and the compound is the cobaltous chelate of diphenoxydibenzoylmethane.

4. The compound of claim 1 wherein the metal is manganese and the compound is the manganous chelate of diphenoxydibenzoylmethane.

5. The compound of claim 1 wherein the metal is lead and the compound is the plumbous chelate of diphenoxydibenzoylmethane.

6. The compound of claim 1 wherein the metal is iron and the compound is the ferrous chelate of diphenoxydibenzoylmethane.

7. The compound of claim 1 wherein the metal is copper and the compound is the copper chelate of diphenoxydibenzoylmethane.

8. The compound of claim 1 wherein the metal is tin and the compound is the tin chelate of diphenoxydibenzoylmethane.

References Cited
UNITED STATES PATENTS 3,254,103  5/1966  Melby et al. _____ 260—429.2

TOBIAS E. LEVOW, Primary Examiner

A. P. DEMERS, Assistant Examiner

U.S. Cl. X.R.

252—399, 400; 260—429.2, 429.3, 429.5, 429.7, 429.9, 430, 431, 435, 438.1, 438.5, 439, 440, 446, 448, 590, 611.5

PO-1050
(5/69)

UNITED STATES PATENT OFFICE
CERTIFICATE OF CORRECTION

Patent No. 3,458,548            Dated July 29, 1969

Inventor(s) Emil Herbert Carlson

It is certified that error appears in the above-identified patent and that said Letters Patent are hereby corrected as shown below:

Column 1, line 18, that portion of the sentence reading "3-B" should read -- 3-A --; Column 1, lines 54 and 55, the name "Harmann," should read -- Hammann, --.

Column 2, line 37, that portion of the sentence reading "divalent chelates" should read -- divalent metal chelates --.

Column 3, line 55, the figure "84.2" should read -- 24.2 --.

Column 4, line 3, the word "recation" should read -- reaction --.

Column 5, line 23, after "1-methylcyclohexyl" insert a -- , --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,458,548　　　　　　　　　Dated July 29, 1969

Inventor(s) Emil Herbert Carlson

It is certified that error appears in the above-identified patent and that said Letters Patent are hereby corrected as shown below:

Column 1, line 18, that portion of the sentence reading "3-B" should read -- 3-A --;  Column 1, lines 54 and 55, the name "Harmann," should read -- Hammann, --.

Column 2, line 37, that portion of the sentence reading "divalent chelates" should read -- divalent metal chelates --.

Column 3, line 55, the figure "84.2" should read -- 24.2 --.

Column 4, line 3, the word "recation" should read -- reaction --.

Column 5, line 23, after "1-methylcyclohexyl" insert a -- , --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents